(12) United States Patent
Zadravec et al.

(10) Patent No.: US 11,385,054 B2
(45) Date of Patent: Jul. 12, 2022

(54) STABILIZED OBSERVATION WITH LRF FUNCTION

(71) Applicant: Safran Vectronix AG, Heerbrugg (CH)

(72) Inventors: Dusan Zadravec, Heerbrugg (CH); Daniel Kunz, Widnau (DE)

(73) Assignee: SAFRAN VECTRONIX AG, Heerbrugg (CH)

( * ) Notice: Subject to any disclaimer, the term of this patent is extended or adjusted under 35 U.S.C. 154(b) by 307 days.

(21) Appl. No.: 15/408,663

(22) Filed: Jan. 18, 2017

(65) Prior Publication Data
US 2017/0211932 A1 Jul. 27, 2017

(30) Foreign Application Priority Data
Jan. 21, 2016 (EP) ..................................... 16152316

(51) Int. Cl.
*G01C 3/04* (2006.01)
*G01S 17/08* (2006.01)
(Continued)

(52) U.S. Cl.
CPC ................. *G01C 3/04* (2013.01); *G01C 3/08* (2013.01); *G01S 17/08* (2013.01); *G02B 27/646* (2013.01)

(58) Field of Classification Search
CPC .................................. G01C 15/00; G01C 3/08
See application file for complete search history.

(56) References Cited

U.S. PATENT DOCUMENTS 3,435,227 A * 3/1969 Arazi ....................... G01S 17/32
                                                           250/202
6,573,981 B2 * 6/2003 Kumagai ................ G01C 15/00
                                                           33/291
(Continued)

FOREIGN PATENT DOCUMENTS

EP          1744196 A1     1/2007
EP          1748309 A1     1/2007
(Continued)

OTHER PUBLICATIONS

Asus, "Asus Brings ZenFone Zoom to Europe," Sep. 2, 2015, XP055287082.
(Continued)

*Primary Examiner* — Hovhannes Baghdasaryan
(74) *Attorney, Agent, or Firm* — Muncy, Geissler, Olds & Lowe, P.C.

(57) ABSTRACT

The invention relates to a hand-held observation device. The observation device is characterized in that a first observation channel comprises a first opto-mechanical stabilization unit for actively and equally stabilizing, during an observation, a first observation optical axis and an LRF axis of an integrated laser range finder by compensating for hand jitter during the observation, the first opto-mechanical stabilization unit being adapted for continuously adjusting and setting a lateral position (with respect to the optical axis) of at least one lens of the objective optical system of the first optical observation channel, in a way automatically controlled by an electronic processing and control unit, which reads and processes the gyro sensor data, particularly in a way wherein the adjusting of the lateral position of the at least one lens equally stabilizes the first observation optical axis and the LRF axis in one go.

11 Claims, 4 Drawing Sheets

(51) Int. Cl.
  *G02B 27/64* (2006.01)
  *G01C 3/08* (2006.01)

(56) References Cited

U.S. PATENT DOCUMENTS

| | | | |
|---|---|---|---|
| 6,862,084 B2 | 3/2005 | Nagata et al. | |
| 8,717,548 B2* | 5/2014 | Pernstich | B25G 1/00 356/5.01 |
| 2003/0002149 A1* | 1/2003 | Watanabe | G01S 17/86 359/407 |
| 2004/0046953 A1* | 3/2004 | Nagata | G01C 3/08 356/4.01 |
| 2008/0204702 A1* | 8/2008 | Gerth | G01C 3/04 356/5.01 |
| 2010/0321669 A1* | 12/2010 | Yamada | G01C 3/08 356/4.01 |
| 2014/0063261 A1* | 3/2014 | Betensky | G01C 3/08 348/158 |
| 2014/0071432 A1* | 3/2014 | Dunne | G01S 7/4802 356/5.01 |
| 2017/0234972 A1* | 8/2017 | Takizawa | G01C 3/06 356/5.01 |

FOREIGN PATENT DOCUMENTS

| | | |
|---|---|---|
| FR | 2965935 A1 | 4/2012 |
| WO | 20060071720 A2 | 7/2006 |

OTHER PUBLICATIONS

EP 16 15 2316, European Search Report, dated Jul. 11, 2016, pp. 1-6.

* cited by examiner

STABILIZED OBSERVATION WITH LRF FUNCTION

CROSS REFERENCE TO RELATED APPLICATIONS

This application claims priority to European Patent Application No. 16152316.2, which was filed in the European Patent Office on Jan. 21, 2016, and which is herein incorporated by reference in its entirety.

The invention relates to an observation device comprising a laser rangefinder and an opto-mechanical stabilization unit for actively and equally stabilizing the observation optical axis and the LRF axis, according to the preamble of Claim 1.

Such observation devices have diverse fields of application, for example in hunting, for landmark navigation on land or at sea, for aiming at objects, for acquiring and documenting geographic surroundings, as information device for hikers, etc. In addition to such civilian fields of application, such devices are also used in the military sector for navigation, observation, etc. It is important for the device to be robust, convenient, operable in a quick and simple manner, and as compact and as light as possible as well as to have comparatively low power consumption.

The observation devices within the scope of the present invention are robust devices designed for use in the field. These devices are not highly precise and correspondingly sensitive geodetic surveying devices such as tachymeters or theodolites with measurement resolutions in the millimeter range or with higher measurement resolutions, which are used e.g. in the construction sector. The devices described here usually have measurement resolutions of the order of meters or, at best, decimeters, but have measurement ranges of several kilometers, for example of up to five, ten or twenty kilometers or even more. The observation devices are primarily designed for hand-held use by persons, i.e., for example, as field glasses or binoculars, monocular telescopes, spotting scopes, etc., but can by all means be attached to a tripod or the like if necessary.

The observation devices treated here can particularly comprise an optically transmissive light channel, i.e. being conventional optical devices in terms of the basic function thereof, in which optical radiation is directed directly from the observed target object into the eye of the observer. However, in other embodiments, these can also be observation devices in which an observation image is recorded using a camera, the image is converted into electrical signals and the electrical signals are reproduced for the observer on a screen display. Here, especially in the case of the devices with a screen, the observation through an eyepiece, through which the recorded observation image can be observed, can be brought about in the conventional manner. Here, the observation path can by all means comprise optical elements for beam shaping, beam deflection, mirroring information in and out, amplifying residual light, etc. Specifically, this can relate to hand-held observation devices or distance-measuring observation devices which are generically embodied for use as a hand-held device, for example by appropriate handles, shaping, etc.

Here, the optical targeting enabled by the observation device also determines the direction of the distance measurement. The point to be measured is targeted by means of the transmissive light channel, for example by means of crosshairs in the observation channel of the device. In the case of electro-optical distance meters or rangefinders (LRF), an optical signal, for example as optical radiation in the form of laser light pulses, is emitted by the device in the direction of the target object, the distance of which is intended to be determined. If visible light is used in the process, the point on the target object targeted for measuring purposes can be identified visually in the case of appropriate light conditions. However, non-visible wavelengths, e.g. in the infrared spectral range, are often used and the point on the target object targeted for measuring purposes is determined for the user purely by targeting with the observation channel of the device.

The surface of the target object casts back at least a portion of the emitted optical signal, usually in the form of a diffuse reflection. In the device, the cast-back optical radiation is converted into an electrical reception signal by a photosensitive detector element. The distance between the device and the target object can be determined with knowledge of the propagation speed of the optical signal and on the basis of the determined travel time between emission and reception of the signal (i.e. the travel time which light requires for covering the distance from the device to the target object and back again). There usually are one or more optical components for beam shaping, deflection, filtering, etc.—such as lens elements, wavelength filters, mirrors, etc.—in the optical transmission or reception path. Transmission and reception can be brought about coaxially using a single optical unit or separately using two separated optical units (e.g. arranged next to each other). Here, the distance meter or the rangefinder is integrated in the observation device.

The measurement requires sufficiently strong signal intensities, which can be detected by the receiver, of the returning reception signal. However, the signal power that can be emitted from the optoelectronic LRF considered here is restricted by physical and regulatory limits. Therefore, work is often undertaken with pulsed operation. Thus, the intensity amplitude of the emitted optical signal is modulated in a pulse-like manner. Temporally short pulses with a high peak power are emitted, followed by pauses during which no light is emitted. Hence, the cast-back component of the pulses has a sufficiently high intensity to allow these to be evaluated in the presence of background disturbances and noise, in particular even in the presence of background light (sunlight, artificial illumination, etc.).

In the case of observation devices with rangefinders, ranges from several meters up to many kilometers, for example from 5 m to 20 km or 30 km, are required in this case, and this is required with a measurement accuracy of several meters or even higher measurement accuracy, for example of ±5 m or ±1 m or less. Since, in general, the measurement target does not have special reflective target markers for the measurement (as is conventional in measurement rods, measurement prisms etc. used in surveying), the applied optical distance measurement signal must be embodied and set in the device design in such a way that a distance measurement is possible over the whole specified measurement range (or the range must be specified on the basis of the possibilities of the used signal). Since only a small portion of the emitted radiation returns to the receiver in the case of natural or non-cooperative targets, usually the signal information from a plurality of pulses is used cumulatively (in particular in-phase) for the evaluation. In the process, the signal-to-noise ratio (SNR) is improved in order thereby also to enable measurements in adverse conditions. By using a plurality of measurement light pulses on the same target point, disturbance signals are removed by averaging and the target signal is amplified, corresponding to a theoretical SNR improvement of approximately the square root of the number of accumulated pulses.

In a typical use scenario, the user targets a desired target using the observation device and then triggers the distance measuring process, for example by actuating a trigger button or the like. Thereupon, the measurement result, or further in-depth information derived therefrom, such as coordinates, etc., is displayed to said user, preferably directly by means of the observation channel of the observation device.

The observation device can be equipped with means for determining geographic coordinates, such as a GPS, a constellation identifier, a direction measuring unit, a compass unit, tilt sensors or accelerometers, a night vision function, etc. Using an electronic display for providing information, it is possible, for example, to provide to the user in the transmitted light channel an image from a camera, location information, for example in the form of a map, measured distances or directions, stored information in respect of a sighted target object, temperature and weather information using the electronic display. Depending on field of application and demands on the respective measurement situation, the observation device may, in a modified embodiment, be equipped with e.g. a night vision module, etc. In this context, EP 1 744 196 proposes, in an exemplary manner, several different embodiments for a generic observation device, for example for target marking, for military applications or for hunting purposes.

In the case of a hand-held observation, instabilities and movements of the device as a result of being held in the hand are to be expected in this case, especially in the form of oscillations or oscillation-like movements as a result of trembling, swaying or twitching of the user. This human hand tremor or so called hand jitter typically has amplitudes in the range of approx. ±1 mrad to ±5 mrad and jitter frequencies in the range from 0 Hz to approx. 15 Hz, which has a clear visible effect, particularly in the case of faraway targets and high magnifications. In the case of distances of the order of kilometers, small changes in angle of the targeting direction already cause lateral "misses" of the observed target corresponding to several meters. Therefore, continuous, exact targeting of a comparatively small and faraway target is often difficult for the user using a hand-held observation device and requires great concentration and body control. Similar variations in the spatial position of the device can also occur when using the device on an unstable base, such as a land vehicle, aircraft or water vehicle.

As a result of the movements of the observation device, the distance measurement with inclusion of a plurality of measurement light pulses is no longer directed on the same target point, but on a multiplicity of different points around the target which, at least in part, may have varying distances. Therefore, in such a case, the application of a combination of information from a plurality of pulses for determining the distance only brings about a slight improvement in the SNR compared to what is promised from the superposition of information from a plurality of pulses in the theory. This deteriorated SNR can lead to either large measurement errors or to "total miss" of the target. Further increase of the measurement duration for emitting further pulses for improving the SNR, firstly, is undesirable and, secondly, only has limited efficiency due to the further target point deviations occurring thereby.

In the prior art, active dampening or prevention of movements by using a rod or tripod for supporting the device are applied for avoiding trembling movements as a result of being held by hand. However, such additional outlay for setting up the device is undesirable, in particular in view of the primary design as hand-held device.

The field of digital photo and video equipment has also disclosed digital stabilization of an observation image from a hand-held device using a purely screen-based observation. Although such a digital image stabilization can optionally also be present in the observation devices of the present invention, it is then functionally separated from the approach according to the invention which features stabilization without image processing or information obtained therefrom. Thus, the stabilization of the distance measurement according to the invention is not dependent on information generated by digital image processing.

FR 2 965 935 discloses an observation device with indirect, camera-based observation with a digital stabilized observation image, in which there is an accumulation of a plurality of laser pulses for determining the distance. Here, a sequence of light pulses is emitted when the measurement is triggered. The returned echoes are linked to measurement data from a gyroscope measurement of the current trembling movements—as directional deviation in relation to the target direction of the stabilized display image. The echoes are assigned to corresponding zones in the target region on the basis of this angular deviation. The measured values from the zone in which the best SNR value is obtained are used for determining the distance, which is presented to the user.

Electronic components required for digital stabilization use up e.g. additional power and reduce the robustness in rough usage surroundings, for example by the restricted operational temperature ranges of LC displays and CCD cameras. Restricted optical dynamic ranges of these elements and the high computational complexity for digital processing of image information are further undesirable side effects of such solutions.

Mechanical movements of optical elements in the device interior are another solution for actively stabilizing the direction of observation devices; however, it is usually complicated in terms of the realization thereof, reduces the robustness of the device and makes the device larger and heavier. U.S. Pat. No. 6,862,084 B2 describes a solution comprising a vibration isolation device, suspended in a gimbal, which controls an attitude of an optical element constituting the optical system so as to be secured to an inertial system. This way an observation and a range finding optical channel are stabilized separately or, in another solution, the observation and the range finding channels are stabilized as one block suspended in the gimbal. However, these solutions increase complexity and weight of such a device. Additionally, separate stabilized channels impose a very strict tolerance on the moving parts otherwise the laser range finder will not function properly, e.g. caused by boresight errors.

It is an objective of the present invention to improve an observation device with an optoelectronic rangefinder for measuring the distance to a targeted object, in particular of a hand-held observation device, e.g. with an optical transmitted light path for observation and targeting.

Specifically, an objective here lies in improving the attainable accuracy of the distance measurement by rendering the image almost perfectly stable and enabling the laser to hit a small distant target with very high probability each time it is triggered and thus in extending the distance range in which a reliable distance measurement is possible, even if the device is held in the hand.

In particular, it is an objective of the invention to provide opto-mechanical stabilization of both the observation and laser range finding optical axis with respect to hand-jitter, particularly by an increased precision and speed of the stabilization but with minimal size and weight of the mechanism.

A further objective is to provide additional flexibility for the user and/or for upgrading generic observing devices with minimal technical outlay.

The invention relates to a hand-held observation device, comprising at least a first optical observation channel for observations defining a first observation optical axis by receiving and imaging optical light rays onto an image plane, in particular the light rays being within the visible wavelength range for optical observations by the eye of an observer, a gyro sensor unit for recording gyro sensor data giving indication about hand-jitter during observation, a laser range finding unit for determining the distance along a LRF axis (i.e. the axis of the laser range finder) between the observation device and a target, the laser range finding unit comprising a laser transmission channel and a laser receiver channel, in particular wherein the laser transmission and the laser receiver channels are overlapping at an adequate distance off thus defining the LRF axis (i.e. the laser transmission and the laser receiver channels are substantially coaxial (→parallel next to each other or true coaxial), that means coaxial at least if regarded from a considerable distance off), and the laser transmission channel and/or the laser receiver channel being coupled into the first observation channel. The observation device is characterized in that the first observation channel comprises a first opto-mechanical stabilization unit for actively and equally stabilizing, during an observation, the first observation optical axis and the LRF axis by compensating for hand-jitter during the observation, the first opto-mechanical stabilization unit being adapted for continuously adjusting and setting a lateral position (with respect to the optical axis) of at least one lens of the objective optical system of the first optical observation channel, in a way automatically controlled by an electronic processing and control unit, which reads and processes the gyro sensor data, particularly in a way wherein the adjusting of the lateral position of the at least one lens equally stabilizes the first observation optical axis and the LRF axis in one go. The electronic processing and control unit controls small motors in the stabilization mechanism, which in turn move the one or more lenses of the opto-mechanical stabilization unit. The one or more lenses are moved according to a special formula, which is particularly based on the gyro sensor data, the power of the lens(es) and its (their) position within the system, taking further into account the specific wavelength of the laser and potentially different focal lengths pertaining to the laser and receiver in order to assure that also laser and receiver will be moving parallel to each other. In case that e.g. the laser emitter is separate from the observation optics the stabilization mechanism has to be properly adapted and the stabilization formula is adjusted with respect to new parameters.

A stabilized observation (with or without a laser range measurement) starts, for example, when activating a trigger button, which opens a time window for stabilized view. The end of the time window can be defined by a second activation of the same or another button, by a predetermined temporal measurement duration, and/or, in case of a laser range measurement, by reaching a predetermined minimum number of pulses to be accumulated or by reaching a minimum number of pulses at which a sufficient SNR threshold of the accumulated information is reached.

Therefore, the laser pointing, defined by the LRF axis, together with the image in the image plane of the observing device with respect to the observation optical axis are almost perfectly stabilized, enabling the laser to hit a small distant target with very high probability each time it is triggered and thus in extending the distance range in which a reliable distance measurement is possible.

Furthermore, the solution according to the invention ensures minimal technical outlay, since both the observation optical channel and the LRF channel can be stabilized by movements of the same optical component(s) in one go and thus the solution provides an increased precision and speed of the stabilization but with minimal size and weight of the mechanism. This also keeps the observation device robust and compact for use in the field and operable in a quick and simple manner.

In a particular embodiment the observation device is based on a monocular optical system comprising one observation channel with the first opto-mechanical stabilization unit, and with the laser transmission channel, comprising an additional stabilization unit, being separate from the observation channel and the laser receiver channel being coupled into the observation channel by a beamsplitter, the beamsplitter particularly being a semi-reflecting mirror or a prism. Here, having two separate channels for the laser reception and transmission can be advantageous in terms of the optical setup, e.g. having a separate objective output for the laser comprising additional optics such as specific filters for the laser light which would interfere with the observation channel, and the electronics of the laser range finding unit.

Another monocular embodiment, ensuring an even more compact setup, is given when both the laser transmission and receiving channels are coupled into the observation channel by a beamsplitter, the beamsplitter particularly being a semi-reflecting mirror or a prism, and thus only the first opto-mechanical stabilization unit is required to stabilize the one observation channel and the laser emission/transmission channel in one go.

In a further embodiment, the observation device is laid out as a binocular optical system with a first and a second binocular channel.

In a specific binocular embodiment the observation device is characterized in that the first binocular channel, comprising the first observation channel and the laser transmission channel, being used for transmission of the laser light towards the target, and the second binocular channel, comprising a second observation channel and the laser receiver channel, being used for receiving of the laser light reflected at the target, the first and second observation channels respectively comprising the first and a second opto-mechanical stabilization unit. In particular, ensuring a most compact setup, the laser transmission channel is coupled into the first observation channel and the laser receiver channel is coupled into the second observation channel, in particular wherein coupling happens by two beamsplitters, respectively, the beamsplitters particularly being semi-reflecting mirrors or prisms.

Alternatively, in another embodiment the laser transmission channel, comprising a third stabilization unit, is separate from the first observation channel and the laser receiver channel is coupled into the second observation channel by a beamsplitter, the beamsplitter particularly being a semi-reflecting mirror or a prism. This embodiment is slightly less favourable because it involves at least three stabilization units but on the other hand it might be favourable to have a separate objective output for the laser, e.g. comprising additional optics such as specific filters for the laser light which would interfere with the observation channel.

Regarding optimized redundancy in the field or a potential use of different laser sources at different occasions, e.g. a visible and an infrared laser source invisible to the human eye, another embodiment of a binocular observation device describes a binocular with the first and the second binocular channel having identical opto-mechanical setups respectively comprising the first observation channel with the first opto-mechanical stabilization unit and the second observation channel with the second opto-mechanical stabilization unit, and the two binocular channels respectively comprising a first and a second laser range finding unit, wherein for each laser range finding unit the respective laser transmission and laser receiver channels are parallel (or—if considered from a distance off—almost coaxial) and form a first and a second laser range finding channel, and the first and second laser range finding channels are respectively coupled into the first and second observation channels, the coupling being done by a first and a second beamsplitter, respectively, in particular the beamsplitters being semi-reflecting mirrors or prisms.

In another embodiment of a binocular device one binocular channel is kept as an independent observation channel and thus the first binocular channel is solely used as an observing channel, comprising the first opto-mechanical stabilization unit, whereas the second binocular channel comprises the second observation channel with the second opto-mechanical stabilization unit and the laser range finding unit, comprising the laser transmission channel and the laser receiving channel, with both the laser transmission and receiving channels being coupled into the second observation channel by a beamsplitter, the beamsplitter particularly being a semi-reflecting mirror or a prism. On the expense of involving a third stabilization unit, but e.g. with the advantage of having a separate objective output for the laser, e.g. comprising additional optics such as specific filters for the laser light which would interfere with the observation channel, the laser transmission channel, comprising the third opto-mechanical stabilization unit, might also be separate from the second observation channel and the laser receiver channel being coupled into the second observation channel by a beamsplitter, the beamsplitter particularly being a semi-reflecting mirror or a prism.

Another particularly useful embodiment providing additional flexibility for the user or the potential for combining with or for upgrading of generic observing devices describes a solution where the stabilization components, i.e. the first opto-mechanical stabilization unit and if applicable the second and/or the third opto-mechanical stabilization units, the gyro sensor unit, and the electronic processing and control unit are embedded in one single attachment unit, which is detachable from the observation device. This provides additional flexibility for the user in that he can take the attachment along only if the use in the field is anticipated. Furthermore, this solution does not require a modification of an existing generic device without a stabilizing unit and thus the attachment unit can be used for upgrading such generic devices with minimal technical outlay.

The observation device according to the invention can particularly comprise an optically transmitting light channel, i.e. being a conventional optical device in terms of the basic function thereof, in which optical radiation is directed directly from the observed target object into the eye of the observer. However, in a particular embodiment the first observation channel, and if applicable the second observation channel respectively, comprise a first and a second opto-electronic display means, respectively, for real-time processing and digitally displaying the image plane of the first and second observation channel, respectively, providing additional displaying functionalities, in particular for displaying range information and/or color rendering for enhancing contrast and/or for displaying image information detected outside of the visual wavelength range.

In another embodiment the first observation channel comprises a first visual observation channel, in particular comprising the first opto-electronic display means, for real-time observing of the image plane of the first observation channel by eye, and an additional first electronic imaging channel comprising electronic imaging means, particularly CCD sensors and/or CMOS sensors and/or infrared detectors, for digitally storing image information of the image plane of the first observation channel and making said information available for external post-processing.

In the following, the observation device according to the invention is described in more detail in a purely exemplary manner on the basis of specific embodiments schematically depicted in the drawings, with further advantages of the invention also being discussed. In detail:

Figure 1:
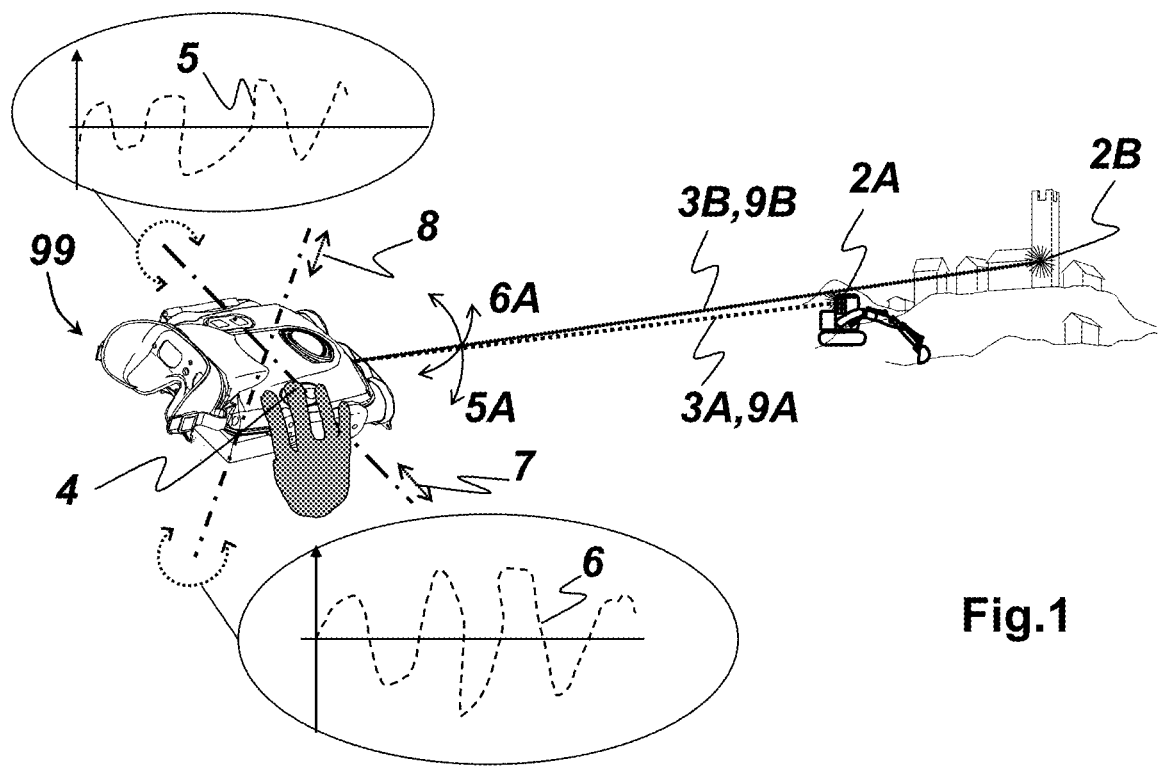
FIG. 1 shows an exemplary illustration of a case of application for a generic observation device without having a stabilizing unit according to the invention.
Figure 3A:
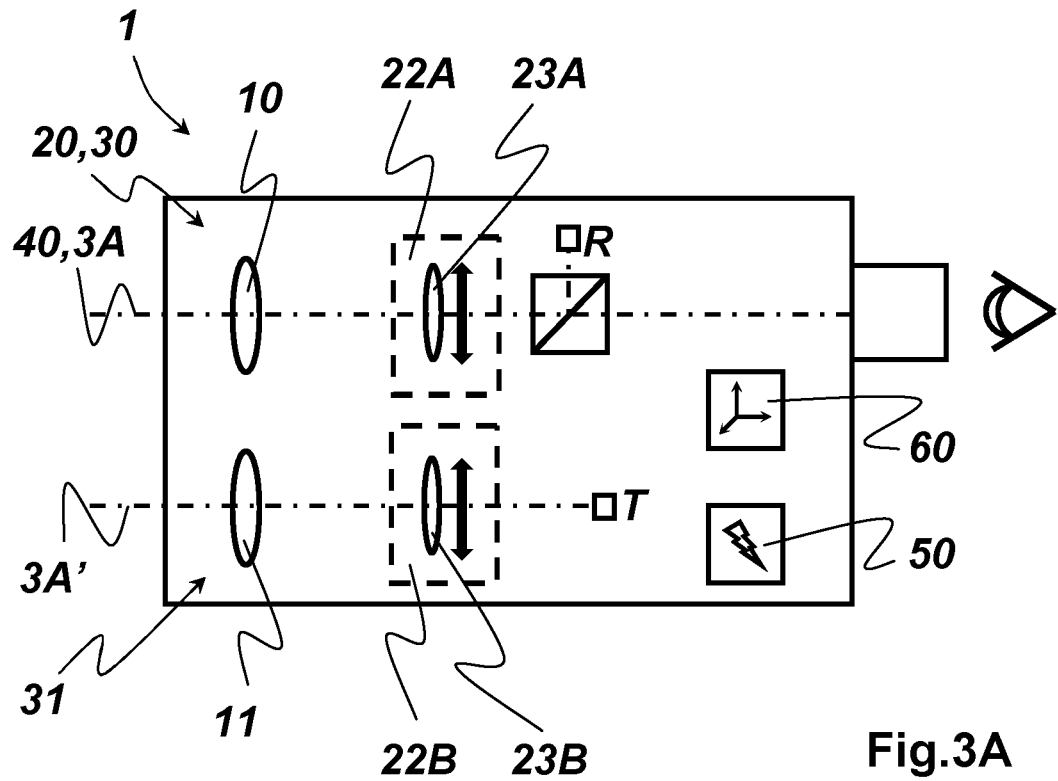
Figure 3B:
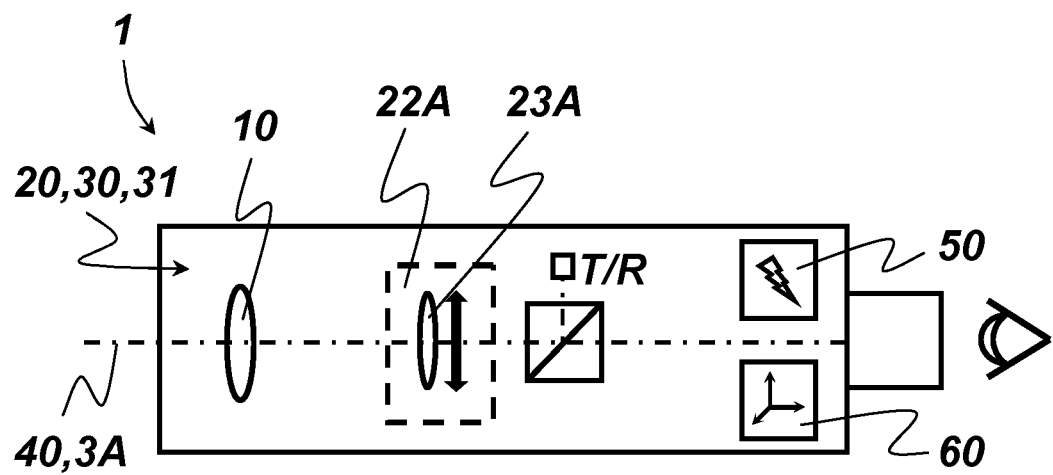
Figure 4A:
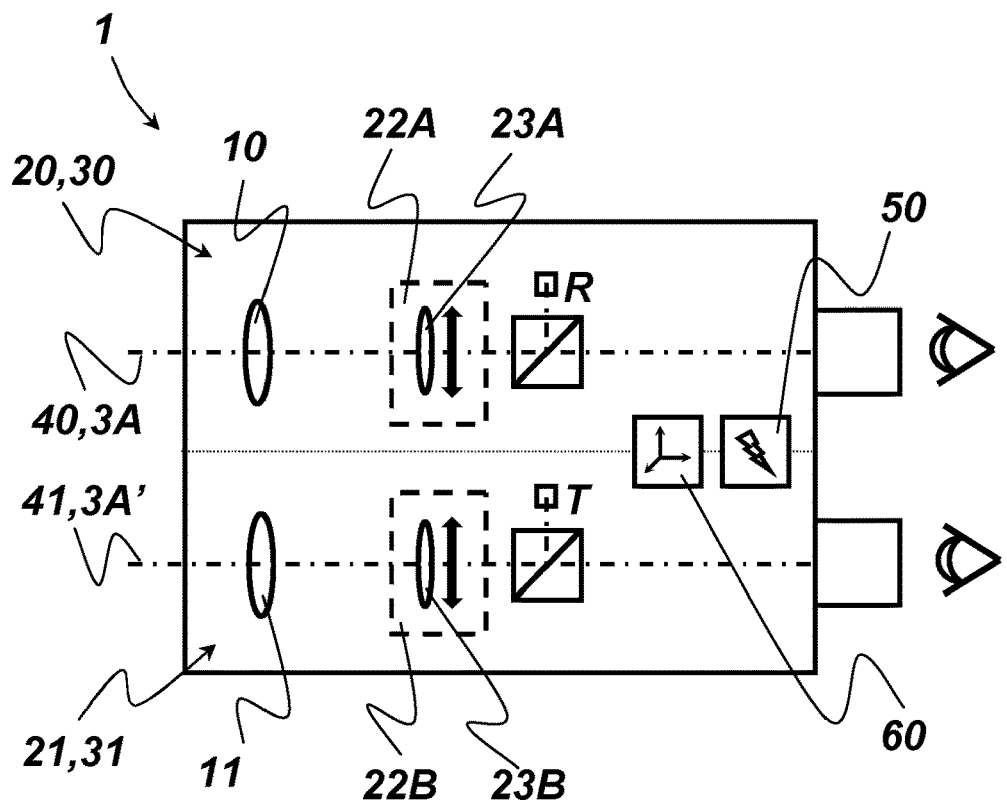
Figure 4B:
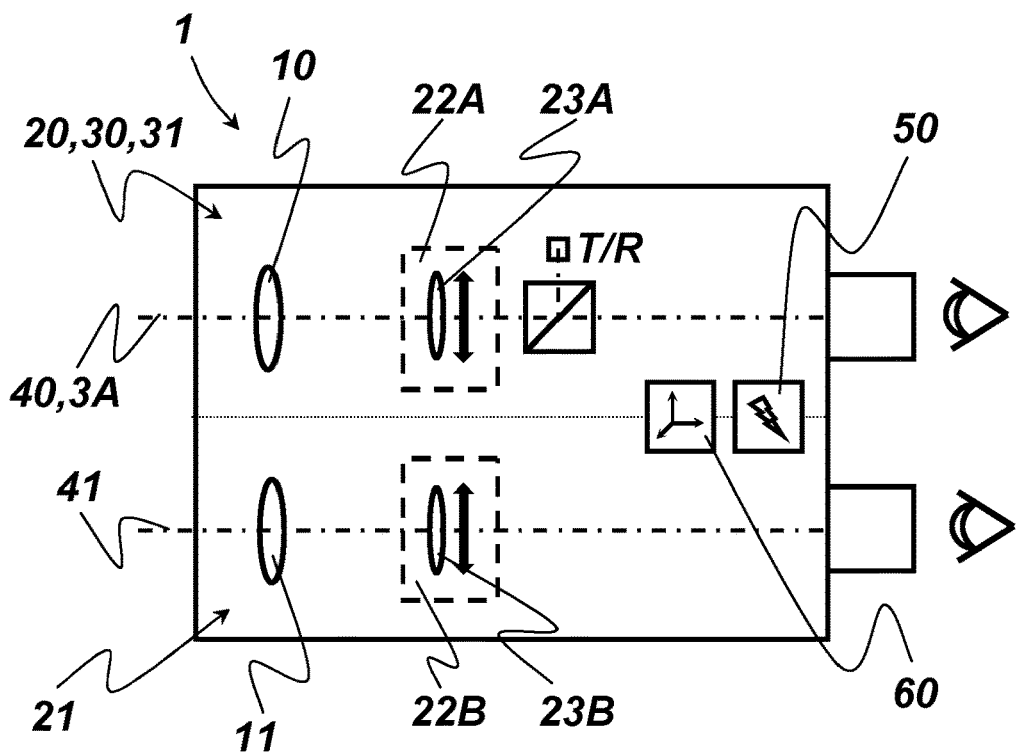
Figure 5:
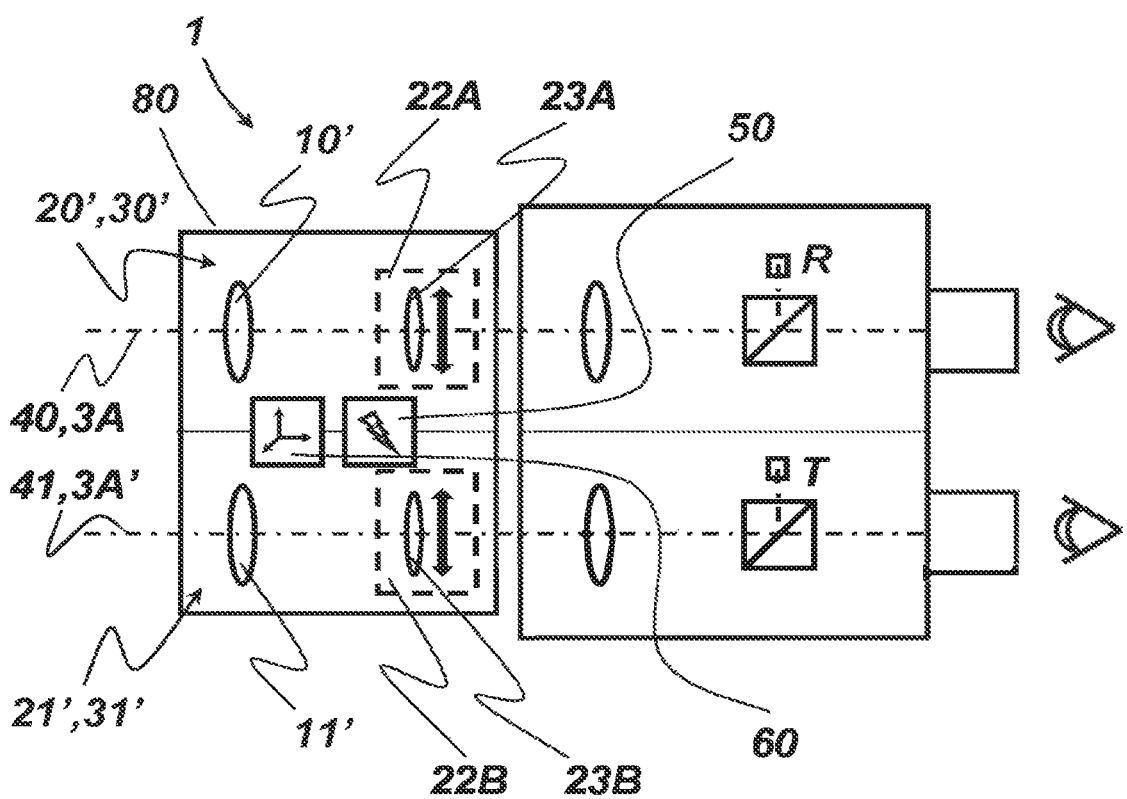

FIG. 3A indicates an exemplary optical assembly of the observing device for a monocular setup;

FIG. 3B indicates another exemplary optical assembly of the observing device for a monocular setup;

FIG. 4A indicates an exemplary optical assembly of the observing device for a binocular setup;

FIG. 4B indicates another exemplary optical assembly of the observing device for a binocular setup;

FIG. 5 indicates an exemplary optical assembly where the stabilization components are integrated into one single attachment unit, which can be detached from the front of the observing device;

FIG. 1 shows an exemplary case for a use of a common observation device 99 without stabilizing unit, comprising a rangefinder (LRF) which is used for targeting a target object 2A and for determining the distance of the target object 2A along the LRF axis 3A pointing in direction 9A from the observer. Here, the observation device 99 has an observation direction which corresponds to the measurement direction of the distance measurement such that the rangefinder can be used to determine a distance to a target point 2B sighted during the observation.

Here, the shown observation device 99 should be used to determine the distance in the direction 9A to the vehicle 2A as target object by emitting light pulses and determining the travel time thereof. To this end, the user holds the observation device 99 and uses the generally magnifying transmitted light channel thereof to target the target object 2A and actuates the trigger 4 in order to trigger a distance measurement. This opens a time window for the measurement. During the time window, signal information from a plurality of pulse components cast back by the target object are accumulated in order to determine the distance thereof. By way of example, the end of the time window can be defined by reaching a predetermined minimum number of pulses to be accumulated or by reaching a minimum number of pulses at which a sufficient SNR threshold of the accumulated information is obtained or on the basis of predetermined temporal measurement duration. The determined distance information is thereupon provided to the user or a data processing unit for further processing. Here, in addition to specifying the determined distance in a display, there can also be a graphical or numerical specification of the spatial position accuracy assigned to the distance measurement, for example also together with an accuracy estimate for the distance. By way of example, this can be brought about numerically or graphically.

The restricted stability of holding the device 99 in the case of handheld observation devices with distance measuring functionality restricts the distance measurement accuracy range considered to be expedient. There is little point in a distance measurement with millimeter accuracy using a hand-held observation device, in particular in the case of measurement distances in the range of several hundred meters or a few kilometers. A magnified observation and measurement of faraway targets is a common object which is to be achieved by such handheld devices. In the fields of application of the generic observation devices 99, a large measurement range, which enables observation and measurement from a comparatively large distance from a danger zone, is to be preferred over a highly precise measurement. Examples for this can be e.g. hunting uses, military or police operations, landmark navigation by pedestrians, land vehicles, aircraft or water vehicles, etc.

However, the correct targeting of the target object 2A and the reliable measurement thereof is of importance. As a result of the hand-jitter instability 5, 6, 7, 8 of holding the device, the targeting does not always point on the target object 2A during the time window. Particularly in the case of relatively large target distances, angle deviations 5, 6 of the order of only a few arc minutes when holding the device by all means cause a deviation, of the order of meters, of the targeted point on the target. By way of example, in the shown figure, this means that the measurement direction does not point the LRF axis 3A in the direction 9A of the desired target object 2A, but rather e.g. in the direction 9B of e.g. the undesired target 2B. However, components cast back by the undesired target 2B do not contribute to measuring the target object 2A, but rather falsify the measurement, make it ambiguous or increase the uncertainty, reduce the SNR or make determining a distance by the evaluation unit completely impossible. It may even be the case that the observation device outputs to the user the distance to the object 2B in direction 9B even though the user tried to target the object 2A in good faith and accordingly assumes to be measuring this distance. Particularly if such an error can be traced back to a chance inexpedient correlation of the pulse emission with the instability, such an error may not be apparent to the user in any way.

Figure 2:
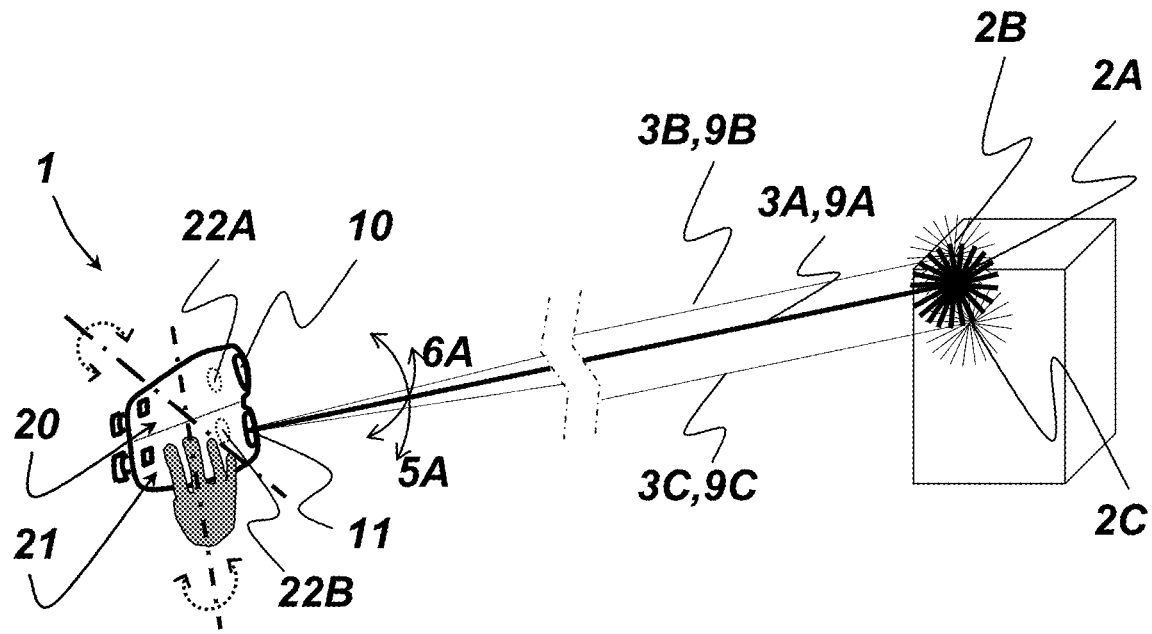
FIG. 2 shows an exemplary illustration of a case of application for an observation device according to the invention.

FIG. 2 shows an exemplary illustration for measuring a target object 2A using an observation device 1 according to the invention in the form of binoculars, which the user holds in the hand in order, by looking into the eyepieces, to target the target object 2A for determining the distance along the LRF axis 3A pointing in direction 9A. In the illustration, the optical radiation is emitted and received through one of the objectives 11; thus, this is a coaxial measurement in which the laser transmission and receiver channels 31, 30 are coupled into the second observing channel 21. The objective 11 of the second observation channel 21 thus constitutes part of the laser transmission channel 31 and/or receiver channel 30 of the rangefinder.

The tremor of the hand which is inevitably present causes angular movements 5A, 6A, 5*, 6* (5*, 6* not shown here) in the process, which let the LRF axis 3A to point in direction 9A of the desired targeting for example sway in direction 9B, direction 9C or in any another direction. Thus, different points 2B, 2C, 2* would be measured on the target object in the prior art, or the determined distance value would be determined as a type of averaging of the travel time information to the different target points 2A, 2B, 2C, 2*. When accumulating the signal information, the different targeting could cause e.g. a broadening of the reflection pulse shape in the signal used for determining the distance, which, instead of the lower SNR of the sought-after ideal case of the multi-pulse measurement, can cause a larger width of the measurement uncertainty range and, possibly, also ambiguities in the determined distance. This is the case, even though the user actuates the trigger 4 when, in the view of said user, there is exact targeting of the desired target point 2A.

However, according to the invention both observation channels 20, 21 of the binocular device respectively comprise a first and a second opto-mechanical stabilization unit 22A, 22B for actively stabilizing, during an observation, the respective observation optical axis 40, 41 against hand-jittering, wherein the second opto-mechanical stabilization unit 22B equally stabilizes the second observation optical axis 41 and the LRF axis 3A. The opto-mechanical stabilization units 22A, 22B being adapted for continuously adjusting and setting a lateral position of at least one lens 23A, 23B, respectively, of the respective objective optical system, in a way automatically controlled by an electronic processing and control unit 50 (not shown), which reads and processes gyro sensor data from a gyro sensor unit 60 (not shown) of the observation device 1, particularly in a way wherein the adjusting of the lateral position of the at least one lens, respectively, equally stabilizes the respective observation optical axis and the LRF axis in one go, here the second observation optical axis 21 and the LRF axis 3A. Here, lateral means perpendicular to the respective observation optical axis.

The electronic processing and control unit 50 (not shown) controls small motors in the stabilization mechanism, which in turn move the lenses 23A, 23B of the opto-mechanical stabilization units 22A, 22B, respectively. The lenses 23A, 23B are being moved according to a special formula, which is based on the gyro sensor data, the power of the lens 23A, 23B and its position within the system, taking further into account the specific wavelength of the laser and potentially different focal lengths pertaining to the laser and receiver in order to assure that also laser and receiver will be moving parallel to each other. In case that e.g. the laser emitter is separate from the observation optics the stabilization mechanism has to be properly adapted and the stabilization formula is adjusted with respect to new parameters.

A stabilized observation (either observation only or including a laser range measurement) starts when activating a trigger button 4 (not shown), which opens a time window for stabilized view. The end of the time window can be defined by a second activation of the same or another button, by a predetermined temporal measurement duration, and/or, in case of a laser range measurement, by reaching a predetermined minimum number of pulses to be accumulated or by reaching a minimum number of pulses at which a sufficient SNR threshold of the accumulated information is reached.

Therefore, the LRF axis 3A together with the image in the image plane of the observing device (not shown here) with respect to the observation optical axis 40 are almost perfectly stabilized, enabling the laser to hit a small distant target with very high probability each time it is triggered and thus in extending the distance range in which a reliable distance measurement is possible.

FIGS. 3a and 3b indicate exemplary optical assemblies of the observing device 1 for different monocular setups according to the invention, the two embodiments mainly differing by the amount of overlap between the observation channel 20 and the laser transmission and receiver channels 31, 30.

FIG. 3a shows an embodiment where the laser transmission channel 31, comprising the laser transmitter T, is separate from the first observation channel 20, whereas the laser receiver channel 30, comprising the laser receiver R, is coupled into the first observing channel 20, both the observation light and the laser light entering through a common objective 10. Both the observation channel 20 and the laser transmission channel 31 respectively comprise an opto-mechanical stabilization unit 22A, 22B, equally stabilizing the observing optical axis 40 and the LRF axis 3A, 3A' (i.e., particularly, the axes of the transmitter and the receiver of the LRF). Also indicated is a gyro sensor unit 50 and a processing and control unit 60 which reads and processes the gyro sensor data, based on which the opto-mechanical stabilization units 22A, 22B are controlled to equally stabilize the observed image and the laser pointing, i.e. to equally stabilize the observation optical axis 40 and the LRF axis 3A, 3A' by adjusting the lateral position of the respective lenses 23A, 23B of the opto-mechanical stabilization units 22A, 22B, wherein the adjusting of the lateral position of the respective lens, equally stabilizes the respective observation optical axis and the laser optical axis in one go.

A more compact setup is shown in FIG. 3b, presenting an embodiment where both the laser transmission channel 31 and the laser receiver channel 30 are coupled into the observation channel 20 and the one laser source comprises the transmitter T and the receiver R. Thus, the optic setup is greatly simplified and particularly only one objective 10 and one opto-mechanical stabilization unit 22A are required.

Similarly, FIGS. 4a and 4b indicate exemplary embodiments of the observing device 1 for different binocular setups according to the invention, again with the two embodiments mainly differing by the amount of overlap between the two observation channels 20, 21 and the laser transmission and receiver channels 31, 30.

FIG. 4a shows an exemplary embodiment where the first binocular channel 20 is equally used as a first observation channel 20 and as the laser receiver channel 30, comprising the laser receiver R, whereas the second binocular channel is equally used as a second observation channel 21 and as the laser transmission channel 31, comprising the laser transmitter T. Both observation channels 20, 21 respectively comprise a first and a second opto-mechanical stabilization unit 22A, 22B, which are respectively used, on the one hand, for equally stabilizing the image by the first observation channel 20 and the LRF axis 3A (particularly here the laser receiver axis), and, on the other hand, for equally stabilizing the image by the second observation channel 21 and the LRF axis 3A' (particularly here the laser receiver axis), in particular wherein the stabilization is done by adjusting of the lateral position of the respective lenses 23A, 23B of the respective opto-mechanical stabilization units 22A, 22B and wherein the respective observation optical axis and the laser optical axis are stabilized in one go by the same lens adjustment.

Also indicated is a gyro sensor unit 50 and a processing and control unit 60 for reading and processing the gyro sensor data, based on which the opto-mechanical stabilization units 22A, 22B are controlled to equally stabilize the observed image and the laser pointing, i.e. to equally stabilize the observation optical axis 40, 41 and the LRF axis 3A, 3A'.

FIG. 4b shows another exemplary embodiment where the first binocular channel is solely used as a first observation channel 21, whereas the second binocular channel is equally used as a second observation channel 20 and as the laser transmission and receiver channel 31, 30, the laser source and the receiver being combined using special beamsplitters (or several beamsplitters). Again, both observation channels respectively comprise a first and a second opto-mechanical stabilization unit 22A, 22B, which are respectively used, on the one hand, for stabilizing the image by the first observation channel 20, and, on the other hand, for equally stabilizing the image by the second observation channel 21 and the LRF axis 3A.

Another particularly useful embodiment providing additional flexibility for the user or the potential for combining with or for upgrading of generic observing devices is shown in FIG. 5. The embodiment shows a solution where the stabilization components, i.e. the opto-mechanical stabilization units 22A, 22B, the gyro sensor unit 50, and the processing and control unit 60, are integrated into one single attachment unit 80, which can be detached from the front of the device 1, and thus providing additional flexibility for the user in that he can take the attachment 80 along only if the use in the field is anticipated. Furthermore, this solution does not require a modification of an existing generic device without a stabilizing unit and thus the attachment unit 80 can be used for upgrading such generic devices with minimal technical outlay. Here, the attachment unit 80 according to the invention is used for a binocular device and thus comprises a first and a second observation channel 20', 21', which equally are a laser transmission channel 31' and a laser receiver channel 30', respectively.

The invention claimed is:

1. A hand-held binocular device, comprising:
   a first optical observation channel and a second optical observation channel for observations defining a first observation optical axis and a second observation optical axis, respectively, by receiving and imaging optical light rays onto an image plane, the light rays being within the visible wavelength range for optical observations by the eye of an observer;
   a gyro sensor unit for recording gyro sensor data giving indication about jitter during observation; and
   a laser range finding unit (LRF) for determining the distance along a LRF axis between the observation device and a target, the laser range finding unit comprising a laser transmission channel and a laser receiver channel, wherein the laser transmission and the laser receiver channels are fully separate from each other, the laser transmission and the laser receiver channels having separate objective lenses, and the laser transmission and the laser receiver channels defining the LRF axis;
   wherein the laser transmission channel is coupled into the first observation channel by a first beamsplitter, wherein the laser transmission channel and the first observation channel share one of the separate objective lenses,
   wherein the laser receiver channel is coupled into the second observation channel by a second beamsplitter, wherein the laser receiver channel and the second observation channel share another of the separate objective lenses,
   wherein the binocular device comprises a first and a second opto-mechanical stabilization unit, the first opto-mechanical stabilization unit being arranged in the first observation channel and the second opto-mechanical stabilization unit being arranged in the second observation channel, for actively and equally stabilizing, during an observation, the first observation optical axis, the second observation optical axis, and the LRF axis by compensating for the jitter during the observation by continuously adjusting and setting lateral positions of respective lenses of the first and the second opto-mechanical stabilization units in a way automatically controlled by an electronic processing and control unit, which reads and processes the gyro sensor data, wherein the adjusting of the lateral positions of the lenses of the first and the second opto-mechanical stabilization units equally stabilizes the first observation optical axis, the second observation optical axis, and the LRF axis in one go, and wherein the lateral positions of the lenses of the first and the second opto-mechanical stabilization unit being based on the gyro sensor data, the power of the lenses and their positions within the system, the wavelength of the laser light, and the focal lengths pertaining to the laser transmission channel and the laser receiver channel.

2. The hand-held binocular device according to claim 1, wherein the first opto-mechanical stabilization unit and the second opto-mechanical stabilization units, the gyro sensor unit, and the electronic processing and control unit are embedded in one single attachment unit, which is detachable from the binocular device.

3. The hand-held binocular device according to claim 1, wherein the first observation channel comprises:
an opto-electronic display for real-time processing and digitally displaying the image plane of the first observation channel and providing additional displaying functionalities, for displaying range information and/or color rendering for enhancing contrast and/or for displaying image information detected outside of the visual wavelength range.

4. The hand-held binocular device according to claim 1, wherein the first observation channel comprises:
a visual observation channel comprising the opto-electronic display, for real-time observing of the image plane of the first observation channel by eye, and
an additional electronic imaging channel comprising electronic imaging, including CCD sensors and/or CMOS sensors and/or infrared detectors, for digitally storing image information of the image plane of the first observation channel and making said information available for external post-processing.

5. A hand-held observation device embodied as monocular or binocular, comprising
an optical observation channel for observations defining an observation optical axis by receiving and imaging optical light rays onto an image plane, the light rays being within the visible wavelength range for optical observations by the eye of an observer,
a gyro sensor unit for recording gyro sensor data giving indication about jitter during observation, and
a laser range finding unit (LRF) for determining the distance along a LRF axis between the observation device and a target, the laser range finding unit comprising a laser transmission channel and a laser receiver channel,
wherein the laser transmission and the laser receiver channels are coupled into the observation channel by a beamsplitter, wherein the laser transmission channel, the laser receiver channel, and the optical observation channel share an objective lens,
wherein the observation device comprises an opto-mechanical stabilization unit arranged in the observation channel for actively and equally stabilizing, in one go during an observation, the observation optical axis and the LRF axis by compensating for the jitter during the observation by continuously adjusting and setting a lateral position of a lens of the opto-mechanical stabilization unit in a way automatically controlled by an electronic processing and control unit, which reads and processes the gyro sensor data, and wherein the setting of the lateral position takes into account the gyro sensor data, the power of the lens and its position within the system, the wavelength of the laser light, and the focal lengths pertaining to the laser transmission channel and the laser receiver channel.

6. The hand-held observation device according to claim 5, wherein the opto-mechanical stabilization unit, the gyro sensor unit, and the electronic processing and control unit are embedded in one single attachment unit, which is detachable from the observation device.

7. The hand-held observation device according to claim 5, wherein the observation channel comprises:
an opto-electronic display for real-time processing and digitally displaying the image plane of the observation channel and providing additional displaying functionalities, for displaying range information and/or color rendering for enhancing contrast and/or for displaying image information detected outside of the visual wavelength range.

8. The hand-held observation device according to claim 5, wherein the observation channel comprises:
a visual observation channel comprising an opto-electronic display, for real-time observing of the image plane of the observation channel by eye; and
an additional electronic imaging channel comprising an electronic imager, including CCD sensors and/or CMOS sensors and/or infrared detectors, for digitally storing image information of the image plane of the observation channel and making said information available for external post-processing.

9. A hand-held binocular device, comprising:
a first optical observation channel and a second optical observation channel for observations defining a first observation optical axis and a second observation optical axis, respectively, by receiving and imaging optical light rays onto an image plane, the light rays being within the visible wavelength range for optical observations by the eye of an observer;
a gyro sensor unit for recording gyro sensor data giving indication about jitter during observation; and
a laser range finding unit (LRF) for determining the distance along a LRF axis between the observation device and a target, the laser range finding unit comprising a laser transmission channel and a laser receiver channel, wherein the laser transmission and the laser receiver channels are fully separate from each other, the laser transmission and the laser receiver channels having separate objective lenses, and the laser transmission and the laser receiver channels defining the LRF axis;
wherein the laser transmission channel is coupled into the first observation channel by a first beamsplitter, wherein the laser transmission channel and the first observation channel share one of the separate objective lenses,
wherein the laser receiver channel is coupled into the second observation channel by a second beamsplitter, wherein the laser receiver channel and the second observation channel share another of the separate objective lenses, wherein the binocular device comprises a first and a second opto-mechanical stabilization unit, the first opto-mechanical stabilization unit being arranged in the first observation channel and the second opto-mechanical stabilization unit being arranged in the second observation channel, for actively and equally stabilizing, during an observation, the first observation optical axis, the second observation optical axis, and the LRF axis by compensating for the jitter during the observation by continuously adjusting and setting lateral positions of respective lenses of the first and the second opto-mechanical stabilization units in a way automatically controlled by an electronic processing and control unit, which reads and processes the gyro sensor data, wherein the adjusting of the lateral positions of the lenses of the first and the second opto-mechanical stabilization units equally stabilizes the first observation optical axis, the second observation optical axis, and the LRF axis in one go, and wherein the first opto-mechanical stabilization unit and the second opto-mechanical stabilization units, the gyro sensor unit, and the electronic processing and control unit are embedded in one single attachment unit, which is detachable from the binocular device.

10. The hand-held binocular device according to claim 9, wherein the first observation channel comprises:
an opto-electronic display for real-time processing and digitally displaying the image plane of the first observation channel and providing additional displaying functionalities, for displaying range information and/or color rendering for enhancing contrast and/or for displaying image information detected outside of the visual wavelength range.

11. The hand-held binocular device according to claim 9, wherein the first observation channel comprises:
a visual observation channel comprising the opto-electronic display, for real-time observing of the image plane of the first observation channel by eye, and
an additional electronic imaging channel comprising electronic imaging including CCD sensors and/or CMOS sensors and/or infrared detectors, for digitally storing image information of the image plane of the first observation channel and making said information available for external post-processing.

* * * * *